Patented Aug. 19, 1952

2,607,770

UNITED STATES PATENT OFFICE 2,607,770

STREPTOMYCYL AMINES AND PRODUCTION THEREOF

Walter A. Winsten, Forest Hills, Murray Katz, New York, and Sidney R. Safir, White Plains, N. Y., assignors to Schenley Industries, Inc., a corporation of Delaware No Drawing. Application August 15 1947, Serial No. 768,940

7 Claims. (Cl. 260—210)

Our invention relates to antibiotic derivatives of streptomycin and method of making the same.

Streptomycin is an antibiotic which is obtained from certain strains of *Streptomyces griseus*. It is well known that streptomycin is substantially wholly antibiotically inactivated by reacting it with certain compounds which have alpha-amino-beta mercapto groups. Among these compounds which substantially inactivate streptomycin, are l-cysteine, cysteinyl-glycine, dl-beta-beta-dimethylcysteine, l-cysteine ethyl ester, and so forth.

The compound above designated as l-cysteine is also designated as 1-2-amino-3-mercaptopropanoic acid, and also as 1-beta-mercaptoalanine. Its formula is

HS.CH$_2$.CH(NH$_2$)COOH

The formula of l-alanine, also designated as 1-2-aminopropanoic acid, is

CH$_3$CH(NH$_2$)COOH

As later mentioned, we use cysteine hydrochloride in order to produce the inactive derivative of streptomycin. The formula of cysteine hydrochloride is HS.CH$_2$.CH(NH$_2$.HCl)COOH We have discovered that if the resultant substantially inactive streptomycin derivatives are treated with Raney nickel so as to produce simultaneous desulfurizing action and reducing action, we produce new derivatives of streptomycin which are active as antibiotics against a large number of gram-positive and gram-negative organisms.

When reference is made herein to alpha amino mercapto compounds, we designate organic compounds in which the amino group, and the sulphydryl or mercapto group, are on adjacent carbon atoms of a straight carbon chain.

These new derivatives are not inactivated by said alpha amino mercapto compounds, and by many other compounds which inactivate streptomycin.

Streptomycin has a free aldehyde-carbonyl group which is a part of the streptose portion of the molecule. The composition of streptomycin is set forth by Kuehl et al., in "Journal of American Chemical Society" (1946), vol. 68, page 2096.

According to Kuehl et al., streptomycin consists of a diguanidine base which is designated as streptidine, linked glucosidically to a disaccharide moiety designated as streptobiosamine.

Streptobiosamine consists of streptose, linked glucosidically to N-methyl-l-glucosamine.

For convenience, hereinafter the term "Strep" designates the streptomycin molecule, with the exception of the streptose aldehyde-carbonyl group. For the purposes of our invention, we can use the residue of the streptomycin molecule which results from the elimination of the aldehyde-carbonyl group, or the residue of a streptomycin molecule which has been modified in a group or groups thereof other than the aldehyde-carbonyl group, the aldehyde-carbonyl group having been eliminated from the last-mentioned residue.

We believe that when streptomycin reacts with cysteine at neutral pH, a thiazolidine ring compound of streptomycin is formed. We believe that this derivative is inactive because of the size and shape of the thiazolidine ring group.

The structural formula of thiazole, C$_3$H$_3$NS, is

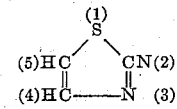

The structural formula of meta-thiazolidine, C$_3$H$_7$NS, is

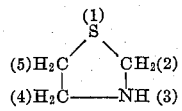

The structural formula of ortho-thiazolidine is

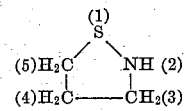

When streptomycin is reacted with l-cysteine, the reaction may be represented as follows:

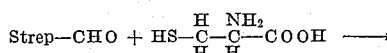
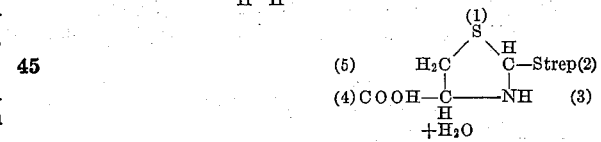

This compound may be designated as, 2 Strep 4-carboxy-thiazolidine.

It is well-known that Raney nickel has a desulfurizing action, and that it also acts as a reducing catalyst with hydrogen. This is disclosed in "Journal of American Chemical Society" (1943), vol. 65, page 1013; also vol. 66 (1944), page 909; also vol. 68 (1946), pages 724 and 1455. Reference is also made to "Journal of Biological Chemistry," vol. 146, page 475. Raney nickel is nickel hydride or a composition which contains nickel hydride.

In using Raney nickel, the use of a hydrogen atmosphere is optional. As usually prepared, Raney nickel contains sufficient adsorbed hydrogen to permit it to produce simultaneous desulfurizing and hydrogenating effects.

Our invention is further disclosed in the following description and examples, which disclose several examples of the class which we designate as amino-mercapto compounds.

EXAMPLE NO. 1

131.5 milligrams of partially purified streptomycin constituting a total of 80,951 units or micrograms of streptomycin base, were dissolved together with 55 milligrams of cysteine hydrochloride, in 10 cubic centimeters of water, at 20° C.–25° C. The pH of the solution was adjusted to 6.2, and the solution was kept at 37.5° C. for 3.5 hours. At the end of this time, assay showed that 21.5% of the original streptomycin antibiotic activity was still present. 30 additional milligrams of cysteine hydrochloride were dissolved in the water of said solution, and the pH was adjusted to 7.0. The solution was kept at 37.5° C. for an additional period of 3 hours. There was less than 1.9% residual antibiotic activity left after this treatment, as compared with the starting material.

This solution was mixed with water, up to a volume of 25 cubic centimeters. 1.25 grams of Raney nickel were added to the solution, and the mixture was agitated at room temperature of 20° C.–25° C. for 6 hours, in a hydrogen atmosphere which was at a pressure of 760 mm. of mercury.

The final pH was 6.5. The solution, after filtration, assayed 47,381 plus or minus 1661 units (calculated to streptomycin). This constituted about 55% of the original activity, after correcting for samples taken for assay. The new product, in crude form, may be isolated by evaporating the solution to a small volume, dissolving the new product in methanol by mixing said concentrated solution with anhydrous methanol, and precipitating the new product from the methanol solution with several volumes of ethyl ether.

Some of the product is adsorbed by Raney nickel. Since, in treating a solution of the new product with fresh Raney nickel, there was a diminution in antibiotic activity, of the new product, this suggests that the new product which is formed by treating the streptomycin-cysteine reaction product with Raney nickel, may have at least and possibly more than 55% of the activity of streptomycin itself on a mol for mol basis.

From the method of synthesis employed, the new active derivative may be represented as,

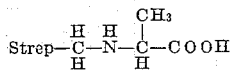

If the group,

be referred to as the streptomycyl group, we may call the new compound N-streptomycyl-1-alanine, since the formula of 1-alanine is $CH_3.CH(NH_2)COOH$.

In treating this new compound with cysteine in the manner above described, no inactivation of the new compound results. This shows the absence of a free aldehyde group in this new compound.

The antibiotic referred to as N-streptomycyl-1-alanine is active as an antibiotic against many gram-positive and gram-negative micro-organisms.

These micro-organisms include *B. subtilis*, *B. mycoides*, *S. aureus* 209 P., *E. Coli*, *S. marcescens*, and unclassified gram-negative cocco-bacillus.

EXAMPLE NO. 2

In this example, we used alpha-mercapto-ethylamine to react with streptomycin, in order to produce a streptomycin derivative of low antibiotic activity.

The formula of alpha-mercapto-ethylamine is $$HS.CH_2.CH_2.NH_2$$

We have used alpha-mercapto-ethylamine hydrochloride, namely, $$HS.CH_2.CH_2.NH_2.HCl$$

Since the mercapto group and the amino group are attached to adjacent carbon atoms, each of said compounds may be designated, for the purposes of our invention, as an alpha-amino-mercapto compound.

Upon treating this substantially inactive derivative of streptomycin with Raney nickel, a large regeneration of antibiotic activity was obtained.

A mixture of 211 milligrams of partly purified streptomycin (representing 109,000 plus or minus 9080 units or micrograms of streptomycin base), and 113 milligrams of beta-mercaptoethylamine hydrochloride was dissolved in 10 cubic centimeters of water; the pH was adjusted to 7.0 with an aqueous solution of sodium hydroxide, and the resulting solution was heated at 50° C. for 75 minutes. Assay at the end of this period gave a recovery of 17,500 plus or minus 770 units, which is equivalent to 16% of the original activity. Therefore, 84% of the original streptomycin activity had disappeared.

A mixture of 5 cubic centimeters of the reaction mixture, 10 cubic centimeters of water, and 0.4 gram of Raney nickel catalyst was shaken under atmospheric pressure of 760 mm. of mercury in an atmosphere of hydrogen, and at room temperature of 20° C.–25° C., for 4.5 hours. The solution was filtered.

Bacterial assay by the usual cup plate method and extrapolation to the total quantity of starting material gave a recovery of 67,800 plus or minus 3850 streptomycin units, or 62% calculated to streptomycin.

If the 16% activity remaining before desulfurization and reduction with Raney nickel is subtracted from the 62%, a 46% net increase in antibiotic activity of the original derivative has been obtained.

From the steps employed in the synthesis, it is highly probable that we have prepared what may be called N-streptomycylethylamine.

In another example of our method, streptomycin was substantially inactivated by alpha-mercaptoethylamine in anhydrous methanol. On treating with Raney nickel in said methanol solution, an increase in activity similar to that noted above was observed. This shows that the formation of an active streptomycin derivative from the substantially inactive reaction product which is obtained when streptomycin and beta-mercaptoethylamine are reacted, can occur in a non-aqueous medium under the influence of Raney nickel.

EXAMPLE NO. 3

This example describes the reaction between l-cysteine ethyl ester and streptomycin, and the hydrogenolysis of the resultant inactive derivative of streptomycin with Raney nickel in order to produce an active derivative of streptomycin.

A. *Water as solvent*

A mixture of 212 milligrams of partially purified streptomycin (representing 145,000 plus or minus 3820 units or micrograms of streptomycin base) and 204 milligrams of l-cysteine ethyl ester hydrochloride, was dissolved in 10 cubic centimeters of water at 20° C.–25° C. The pH of this aqueous solution was adjusted to 6.9 with an aqueous solution of alkali, and the resultant solution, having a volume of 10.6 cubic centimeters, was heated at 50° C. for 1.5 hours, thus producing a solution of the substantially inactive derivative of streptomycin.

Bacterial assay at the end of this period indicated that 4130 plus or minus 387 units remained in said derivative. Therefore, this represented a 97% inactivation.

A mixture of 5 cubic centimeters of said solution, 10 cubic centimeters of water, and 0.75 gram of Raney nickel catalyst was shaken in an atmosphere of hydrogen at 25° C. for 4.5 hours, under a pressure of 760 mm. of mercury. Bacterial assay using *S. aureus* 209 P, which is a strain of *S. aureus,* and extrapolation to the total amount of starting material, gave a recovery of 36,600 plus or minus 6480 units calculated to streptomycin or 25% recovery.

B. *Anhydrous methanol as solvent*

A mixture of 214 milligrams of partly purified streptomycin (representing 128,000 plus or minus 9200 units or micrograms of pure streptomycin base), and 221 milligrams of l-cysteine ethyl ester, was dissolved in 9 cubic centimeters of anhydrous methanol at 20° C.–25° C., and this solution was mixed with 0.4 cc. of a 1.85 M solution of sodium methylate, $CH_3ONa$, in anhydrous methanol. The resulting clear solution was heated at 50° C. for 1 hour, to produce the solution of the inactive derivative. Bacterial assay at the end of this time showed a recovery of 7980 plus or minus 1440 units, which corresponds to an inactivation of 94%.

A mixture of 5 cubic centimeters of said solution, 10 cubic centimeters of anhydrous methanol, and 0.75 gram of Raney nickel catalyst was shaken in an atmosphere of hydrogen, at 25° C. for 615 hours, at a pressure of 760 mm. of mercury.

Bacterial assay and extrapolation to the total amount of starting material, gave a recovery of 49,600 plus or minus 6530 units calculated as streptomycin, or a 39% recovery.

The new derivative formed in either method of this example, is probably the ethyl ester of N-streptomycyl-l-alanine.

It has been found that the amount of Raney nickel used is important. If too much is used, the products described in the examples above may be lost on the Raney nickel. If too little Raney nickel is used, the Raney nickel is apparently used up by the excess of mercapto reagent used, and no activity will be recovered. On adding more Raney nickel the activity can then be recovered. This was especially true for the treatment with Raney nickel of the reaction product of streptomycin and l-cysteine, as in Example No. 1.

For any given case it is a simple matter to determine by trial the best amount of Raney nickel to use.

While in the above examples, an atmosphere of hydrogen was provided during the hydrogenolysis, we have found that the use of a hydrogen atmosphere is not necessary because the Raney nickel itself provides enough adsorbed hydrogen for the desired reaction.

We can react streptomycin with any one of a number of reagents which contain the alpha-amino mercapto groups, and the resulting inactive derivative can then be treated with Raney nickel to give an active antibiotic.

Instead of using streptomycin as a starting material to react with cysteine or its substituents, we can use derivatives of streptomycin which have retained unmodified the streptose aldehyde-carbonyl group, CHO.

Instead of using l-cysteine, we can use d-cysteine or the racemic form, namely dl-cysteine.

Instead of using cysteine, we can use peptides which contain cysteine, either l or d or dl. Such peptides are exemplified by cysteinyl-glycine.

Cysteine is an example of mercapto amino acids, and we can use such acids generally, and their acyl and aryl esters.

We can also use dipeptides or higher dipeptides which include these mercapto amino acids.

We can also use substituted cysteine residues, either l or d or racemic, such as beta-beta-dimethyl cysteine, or beta-methyl-cysteine.

In general, we can also react streptomycin or its derivatives which contain the streptose aldehydic carbonyl group, with aliphatic or aromatic residues represented by,

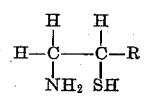

wherein R is a straight chain alkyl or aryl substituted straight chain alkyl group.

Additionally, we can react streptomycin or one of its functional derivatives containing the streptose aldehydic carbonyl group, with a substance represented by the formula, in which $R_1$, $R_2$, $R_3$, and $R_4$ individually have the meaning above assigned to R, as follows:

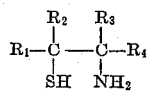

The resultant reaction compound is then treated with Raney nickel to desulfurize said reaction compound, with simultaneous reduction of said resultant reaction compound.

We have described numerous embodiments of our invention, but numerous changes and omissions and additions can be made without departing from its scope.

Thus, we generally claim antibiotic compounds of streptomycin and amino-acids, particularly with amino-acids which occur in proteins, in which the designation "streptomycin" includes derivatives of streptomycin which are reactive with sulfur-containing amino-acids, particularly those which occur in proteins. The principal amino-acids which have been isolated from proteins, as stated at pages 418–419 of "Organic Chemistry," by Desha, published in 1936 by McGraw-Hill Book Company Inc., include glycine, serine, phenylalanine, tyrosine, cystine, proline, and hydroxyproline.

As above stated, and according to one phase of our invention, we finally produce an open chain sulfur-free compound, in which the chain consists of carbon and nitrogen atoms.

We also generally claim substituted streptomyclamine derivatives of streptomycin as antibiotics, where at least one hydrogen atom of the NH₂ group of streptomyclamine is replaced by a substituent.

We claim:

1. The process for manufacturing an antibiotic agent related to streptomycin that comprises reacting a substance of the group consisting of streptomycin and its derivatives having the characteristic streptose aldehyde-carbonyl group, with an alpha amino mercapto straight chain aliphatic compound in a solvent reaction medium, then reducing this reaction product with Raney nickel to produce an antibiotically active substance differing from the starting material in that the streptose carbonyl group is replaced by a substituent of the class consisting of alkyl amino methylene groups and substituted alkyl amino methylene groups of the lower alkyl series, and recovering this hydrogenated compound from the reaction mixture.

2. A process as defined in claim 1 further characterized in that the hydrogenation product recovered is a compound of the group consisting of N-(l-carboxy)-ethyl streptomycylamine, N-ethyl streptomycylamine and N-(l-carboethoxy)-ethyl streptomycylamine.

3. As an antibiotically active streptomycin derivative, an N-mono-substituted streptomycylamine wherein the substituent group is of the class consisting of lower straight chain alkyl groups and aryl substituted lower straight chain alkyl groups.

4. An antibiotically active streptomycin derivative as defined in claim 3 wherein the substituent group is a lower straight-chain alkyl group.

5. An antibiotically active streptomycin derivative as defined in claim 3 wherein the substituent group is an ethyl group.

6. An antibiotically active streptomycin derivative as defined in claim 3 wherein the substituent group is an l-carboxy-ethyl group.

7. An antibiotically active streptomycin derivative as defined in claim 3 wherein the substituent group is an l-carboethoxy-ethyl group.

WALTER A. WINSTEN.
MURRAY KATZ.
SIDNEY R. SAFIR.

REFERENCES CITED

The following references are of record in the file of this patent:

Denkelwater et al.: Science, v. 102 (1945), page 12.